US011265681B1

(12) United States Patent
Lee et al.

(10) Patent No.: US 11,265,681 B1
(45) Date of Patent: Mar. 1, 2022

(54) ELECTRONIC DEVICE CAPABLE OF DETERMINING LOW POWER WIDE AREA NETWORK COMMUNICATION CONFIGURATION AND METHOD THEREOF

(71) Applicant: ELITE SEMICONDUCTOR MICROELECTRONICS TECHNOLOGY INC., Hsinchu (TW)

(72) Inventors: Chun-Yi Lee, Hsinchu (TW); Hung-Ta Tso, Hsinchu (TW); Chun-Chieh Huang, Hsinchu (TW)

(73) Assignee: ELITE SEMICONDUCTOR MICROELECTRONICS TECHNOLOGY INC., Hsinchu (TW)

( * ) Notice: Subject to any disclaimer, the term of this patent is extended or adjusted under 35 U.S.C. 154(b) by 0 days.

(21) Appl. No.: 17/133,672

(22) Filed: Dec. 24, 2020

(51) Int. Cl.
*H04W 4/029* (2018.01)
*H04W 4/80* (2018.01)
*G01S 19/26* (2010.01)
*H04W 4/021* (2018.01)
*H04W 84/12* (2009.01)

(52) U.S. Cl.
CPC ............ *H04W 4/029* (2018.02); *G01S 19/26* (2013.01); *H04W 4/021* (2013.01); *H04W 4/80* (2018.02); *H04W 84/12* (2013.01)

(58) Field of Classification Search
CPC ............................ H04W 4/029; H04W 84/12
See application file for complete search history.

(56) References Cited

U.S. PATENT DOCUMENTS

| 9,252,834 | B2 | 2/2016 | Seller et al. | |
|---|---|---|---|---|
| 10,368,204 | B2* | 7/2019 | Nogueira-Nine | G01S 5/0027 |
| 2014/0167957 | A1* | 6/2014 | Tsuji | G08B 21/24 340/539.13 |
| 2018/0359623 | A1* | 12/2018 | Kim | G01S 19/48 |

FOREIGN PATENT DOCUMENTS

| EP | 1209863 B1 | 9/2005 |
|---|---|---|
| TW | 201034918 A1 | 10/2010 |

* cited by examiner

*Primary Examiner* — Qutbuddin Ghulamali

(57) ABSTRACT

An electronic device is capable of determining a radio communications configuration. The electronic device includes a GPS module arranged for receiving an updated GPS coordinate. A controller is electronically coupled to the GPS module, and arranged for controlling the GPS module to receive the updated GPS coordinate and for determining the radio communications configuration based on the updated GPS coordinate received from the GPS module. A transmitter is electronically coupled to the controller and arranged for transmitting a message from the controller according to the determined radio communications configuration.

14 Claims, 11 Drawing Sheets

ELECTRONIC DEVICE CAPABLE OF DETERMINING LOW POWER WIDE AREA NETWORK COMMUNICATION CONFIGURATION AND METHOD THEREOF

BACKGROUND OF THE INVENTION

1. Field of the Invention

The present invention relates to object tracking, and more particularly, to a method and electronic device capable of determining a current location and then reconfiguring a low power wide area network (LPWAN) communication configuration in order to accurately track location of the electronic device.

2. Description of the Related Art

Logistics systems utilize location data to track movement of an object. Many of the conventional systems utilize terrestrial or satellite signal based receivers to determine the exact location of the object of interest. The systems then use either existing cellular infrastructure such as GSM or GPRS, or broadband wireless systems such as Wi-Fi or WiMAX to wirelessly transmit the location to a server.

Tracking devices employing the above-mentioned methods have a number of drawbacks. One of which is that the above-mentioned networks often require a constant connection according to their various protocols and specifications. To achieve such a goal, sophisticated hardware is required which will drive up the cost of such a tracking device. Also, the constant connection method rapidly drains the battery of the tracking device as well as increases connection fees.

Therefore, there is a need for an electronic device and method capable of determining a low power wide area network (LPWAN) configuration using global positioning system (GPS) coordinates to inexpensively report current position in order to accurately track location and movement of the electronic device.

BRIEF SUMMARY OF THE INVENTION

To achieve these and other advantages and in order to overcome the disadvantages of the conventional method in accordance with the purpose of the invention as embodied and broadly described herein, the present invention provides a method and electronic device that uses GPS data to determine the current location of the electronic device in order to configure a low power wide area network connection to inexpensively report the current location and enable accurate tracking of the electronic device by a remote user.

The present invention uses wireless networks to connect low-power objects and utilizes frequency bands that require little energy. Additionally, communications are minimized in order to reduce power consumption.

For example, communications are limited to a minimal number of uplink messages a day, each of which can carry a payload of a limited number of bytes and up to only several downlink messages per day, each of which can carry a payload of a limited number of bytes.

Also, as an example, the industrial, scientific, and medical (ISM) radio band is used to globally implement LPWAN, which is suitable for applications such as tracking people or objects such as packages. Typically, the ISM radio band is reserved internationally for non-telecommunication use.

Since devices using the ISM band can create interference, regulations on the use of the ISM band vary from country to country. This creates a barrier to global roaming for tracking devices. For example, a device is only allowed to transmit radio messages at 920.5-929.7 MHz frequency band with a maximum 13 dBm output level in Japan while it can transmit radio messages at 902.1375-904.6625 MHz frequency band with an output level up to 24 dBm in the US. It is therefore, an object of the present invention to provide a method and an electronic device that can determine a suitable communications configuration when the tracked target moves from one country to another.

The electronic device of the present invention comprises a GPS module for periodically receiving updated GPS coordinates. A controller is electronically coupled to the GPS module and controls the GPS module to receive the updated GPS coordinates and determines the communications configuration based on the updated GPS coordinates received from the GPS module. A transmitter is electronically coupled to the controller and transmits messages from the controller according to the determined communications configuration.

The present invention reconfigures the radio communications configuration based on the updated GPS coordinates in order to utilize free frequency bands or frequency bands that are open to the public to use free of charge. Various countries throughout the world offer public networks or frequency bands that members of the public can use free of charge.

Another reason that the present invention reconfigures the radios communications configuration based on the updated GPS coordinates is to avoid using prohibited frequency bands.

While a frequency band can be used free of charge in one country or region, a user may have to pay money to use the same frequency band in another country or region.

Similarly, a user may be allowed to use a particular frequency band in one country or region, but may be prohibited from using that particular frequency band in another country.

Since the present invention regularly reconfigures the radios communications configuration based on the updated GPS coordinates, the present invention can find and use frequency bands that are free of charge to use and avoid using prohibited frequency bands.

The messages are received by the LPWAN and relayed across the network to an application server. The application server transmits the map data and location data received in the messages to a user or users. The user is, for example, the recipient waiting for the electronic device, the sender of the electronic device, or both. As a result, users can be notified of the current location of the electronic device and can periodically receive updated location data to enable tracking of the electronic device.

The application server regularly updates the network database to confirm or identify whether countries have changed settings for frequency bands. For example, the application server determines if previously free of charge frequency bands are now pay for use frequency bands or vice versa. Also, the application server determines if previously allowable frequency bands are now prohibited frequency bands or vice versa.

The present invention further comprises a method for determining a radio configuration of an electronic device with a GPS module. The method comprises controlling a GPS module to receive updated GPS coordinates; determining the radio communications configuration based on the updated GPS coordinates; transmitting a message containing the GPS coordinates according to the determined radio configuration to be received by a LPWAN; relaying the message across the network to an application server; and transmitting map data and/or location data according to the message by the application server to at least one user device.

In embodiments, the method further comprises determining, by the application server, if free of charge frequency bands are available in the vicinity of the updated GPS coordinates and updating a network database with available free of charge frequency bands related to the updated GPS coordinates location.

In embodiments, the method further comprises determining, by the application server, if specific frequency bands are prohibited from use in the vicinity of the updated GPS coordinates and updating a network database with prohibited frequency bands related to the updated GPS coordinates location.

In embodiments, the step of controlling the GPS module to receive the updated GPS coordinates comprises controlling the GPS module to periodically receive the updated GPS coordinates.

It is to be understood that both the foregoing general description and the following detailed description are exemplary, and are intended to provide further explanation of the invention as claimed.

DETAILED DESCRIPTION OF THE INVENTION

The present invention will now be described with some preferred embodiments thereof and by referring to the accompanying drawings.

A low-power wide-area network (LPWAN) is a type of wireless telecommunication wide area network designed to allow long-range communications at a low bit rate among things (connected objects), such as sensors operated on a battery. The low power, low bit rate and intended use distinguish this type of network from a wireless WAN that is designed to connect users or businesses, and carry more data, using more power. The LPWAN data rate ranges from 0.3 kbit/s to 50 kbit/s per channel. The present invention reconfigures the radio communications configuration based on updated GPS coordinates in order to utilize free frequency bands or frequency bands that are open to the public to use free of charge. Another reason that the present invention reconfigures the radios communications configuration based on the updated GPS coordinates is to avoid using prohibited frequency bands.

Since the present invention regularly reconfigures the radios communications configuration based on the updated GPS coordinates, the present invention can find and use frequency bands that are free of charge to use and avoid using prohibited frequency bands.

Figure 1:
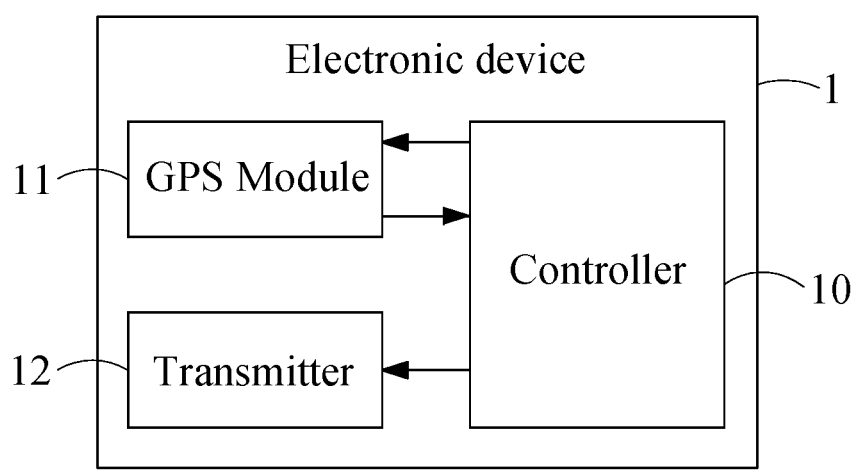
FIG. 1 is a drawing illustrating a block diagram of an electronic device with GPS module according to an embodiment of the present invention.

Refer to FIG. 1, which is a block diagram of an electronic device 1 according to an embodiment of the present invention. The electronic device 1 comprises a controller 10, a GPS module 11, and a transmitter 12. To avoid confusion, the transmitter 12 is a transmitter that is capable of transmitting a radio message which conforms to low power wireless communications specifications. The controller 10 is electronically coupled with the GPS module 11 and the transmitter 12. The controller 10 controls the GPS module to receive updated GPS coordinates that indicate current location of the electronic device 1. The controller 10 then determines a radio communications configuration for the transmitter 12 based on the received updated GPS coordinates. According to different applications, the controller 10 can then compile a message for the corresponding application, and the transmitter 12 transmits the message according to the determined communications configuration. The message is received by a local LPWAN and relayed across the network to an application server. In embodiments of the present invention, the electronic device 1 is able to adjust its radio communications configuration as long as it can acquire GPS coordinates of its current location. Since the electronic device 1 is equipped with the GPS module 11, when the electronic device 1 is in route to its destination and transits through several countries, even continents, the electronic device 1 can still transmit radio messages in each country and thereby achieve global roaming.

Figure 2A:
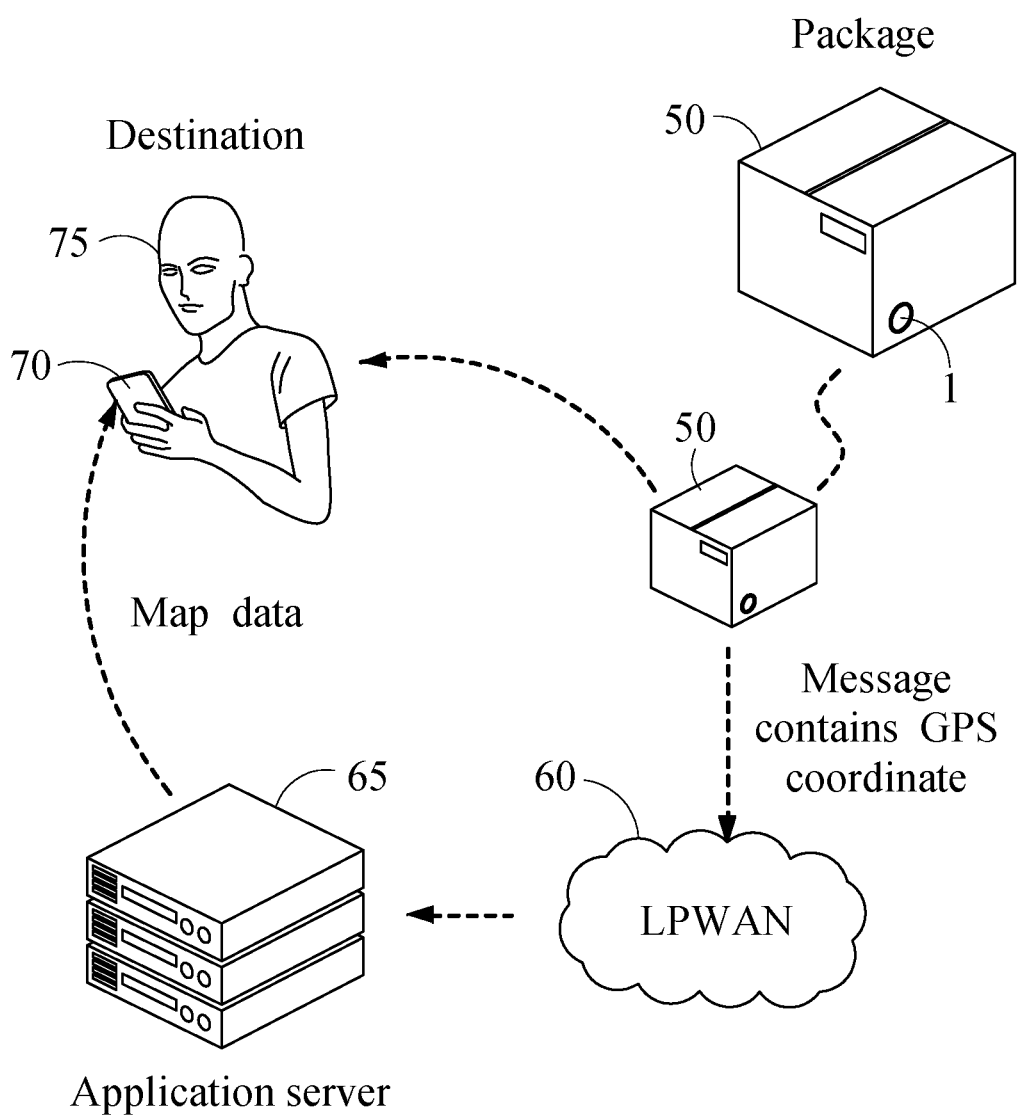
FIG. 2A is a drawing of a tracking system using an electronic device attached to a package according to an embodiment of the present invention.

One application using the electronic device 1 is for tracking. It can be used for tracking of any tangible assets, such as a person, a parcel, a package, or bulk freight. Refer to FIG. 2A, which is a drawing illustrating a tracking system utilizing the electronic device 1 for tracking a package according to an embodiment of the present invention. In this embodiment, the electronic device 1 is a tracker. The electronic device 1 is attached to a package 50 that will be tracked. In this way, when the electronic device 1 travels with the package 50, it will transmit radio messages that contain information of the updated GPS coordinates back to an application server 65 via low power wide area networks 60.

The information of the updated GPS coordinates is parsed and translated into different useful geolocation data depending on the applications run on the application server 65, for example, map data that can be pushed to an application on a user's mobile device 70 so that the user 75 can monitor the location of the package 50. For example, the user 75 is the package recipient or the package sender and the mobile device 70 is a mobile phone or a computer.

In embodiments, the application server 65 regularly determines if there are available free of charge frequency bands in the vicinity of the updated GPS coordinates and the application server 65 updates a network database with available free of charge frequency bands related to the updated GPS coordinates location.

In embodiments, the application server 65 regularly updates the network database with available free of charge frequency bands data for specific regions or globally.

In embodiments, the application server 65 determines if specific frequency bands are prohibited from use in the vicinity of the updated GPS coordinates and updates the network database with data regarding the prohibited frequency bands related to the updated GPS coordinates location.

In embodiments, the application server 65 regularly updates the network database with prohibited frequency bands data for specific regions or globally.

In an embodiment, the controller 10 encrypts the message before transmission.

Since the electronic device 1 only transmits messages after receiving the updated GPS coordinates, the more frequent the controller 10 controls the GPS module 11 to receive the updated GPS coordinates, the more accurate the tracking will be. On the other hand, the more frequent the controller 10 controls the GPS module 11 to receive the updated GPS coordinates, the more power the electronic device 1 will consume.

Therefore, in an embodiment, the controller 10 controls the GPS module 11 to receive the updated GPS coordinates periodically and the frequency of receiving the updated GPS coordinates is no more than a limited number of times per day. For example, some networks such as the Sigfox network only allows 140 messages to be sent daily per device.

Nevertheless, in an embodiment, the controller 10 can modulate the frequency of the GPS module to receive the updated GPS coordinates whenever necessary. For example, the controller 10 will lower the frequency of receiving the updated GPS coordinate when the battery is low in order to conserve power.

In order to achieve a more sophisticated control of the times to receive the updated GPS coordinates without increasing too much power consumption, the electronic device 1 further comprises sensors to identify events that occur during transit.

Figure 2B:
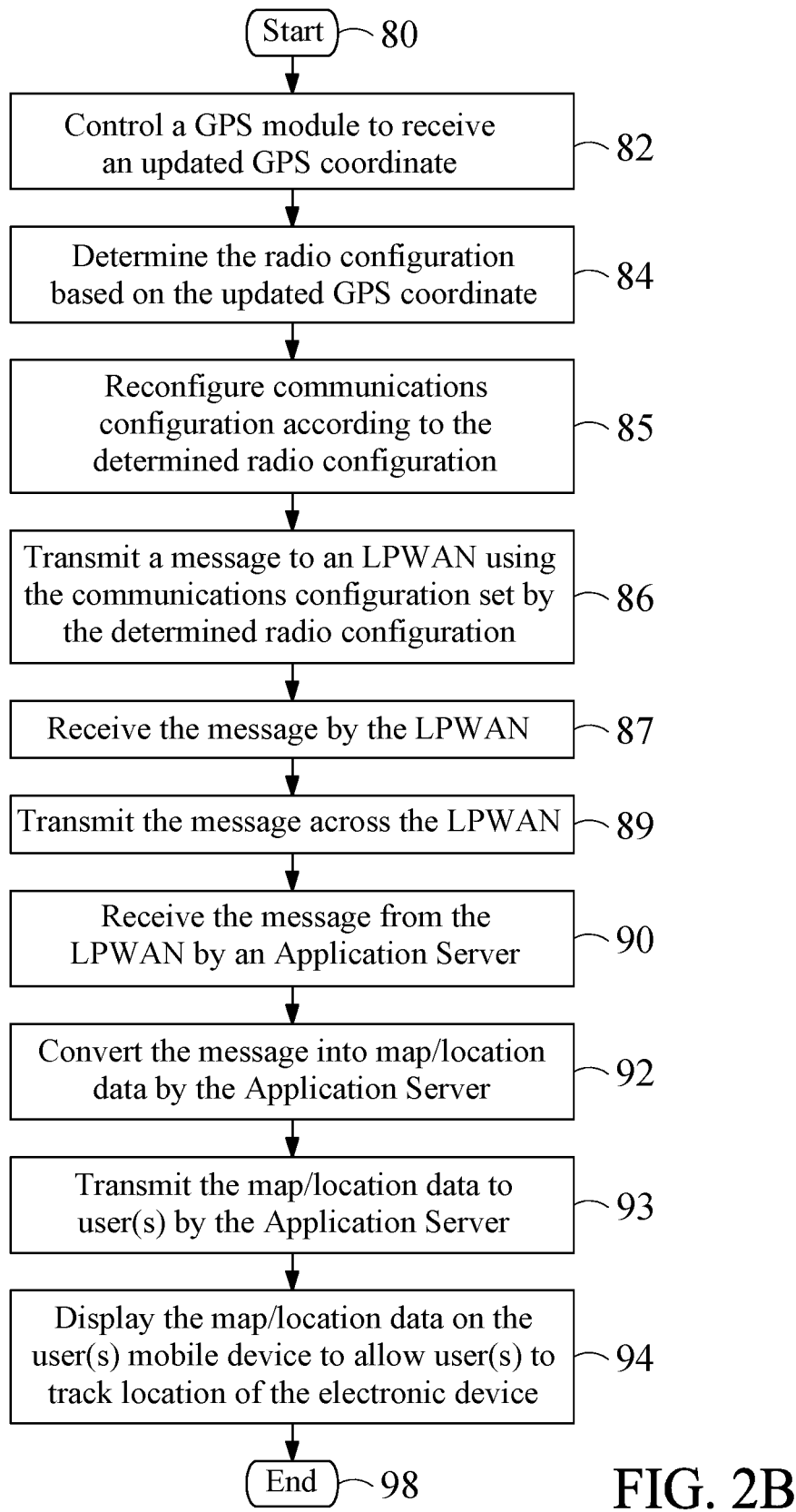
FIG. 2B is a flowchart of a tracking system using an electronic device attached to a package according to an embodiment of the present invention.

Refer to FIG. 2B, which is a flowchart of a tracking system using an electronic device attached to a package according to an embodiment of the present invention. The method comprises:

| Step 80: | Start. |
|---|---|
| Step 82: | Control the GPS module 11 to receive an updated GPS coordinate. |
| Step 84: | Determine the radio communications configuration based on the updated GPS coordinate. |
| Step 85: | Reconfigure the communications configuration according to the determined radio configuration. |
| Step 86: | Transmit a message to an LPWAN using the communications configuration set by the determined radio communications configuration. |
| Step 87: | Receive the message by the LPWAN. |
| Step 89: | Transmit the message across the LPWAN. |
| Step 90: | Receive the message from the LPWAN by the Application Server. |
| Step 92: | Convert the message into map/location data by the Application Server. |
| Step 93: | Transmit the map/location data to user(s) by the Application Server. |
| Step 94: | Display the map/location data on the user(s) mobile device to allow user(s) to track location of the electronic device. |
| Step 98: | End |

Figure 3:
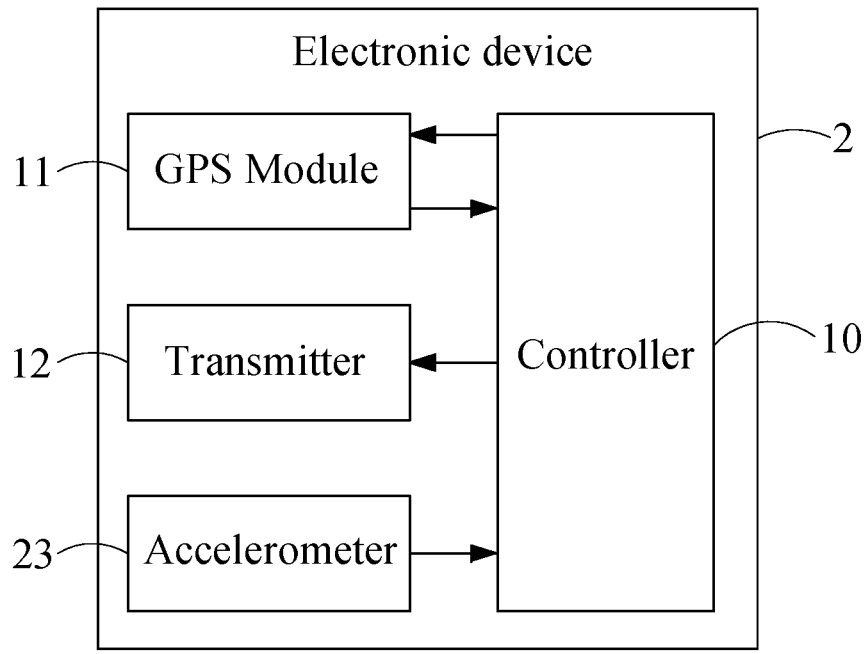
FIG. 3 is a block diagram of an electronic device with accelerometer according to an embodiment of the present invention.

Refer to FIG. 3, which is a block diagram of an electronic device 2 according to an embodiment of the present invention. Since electronic device 2 has a similar component configuration as electronic device 1, components of electronic device 1 that have the same or similar function will be denoted with the same number in order to avoid confusion. The electronic device 2 comprises the controller 10, the GPS module 11, the transmitter 12, and an accelerometer 23. Basic operations of the controller 10, the GPS module 11, and the transmitter 12 are detailed in the previous paragraphs and omitted here for brevity.

When the electronic device 2 is en route to a destination, it might change carriers or forms of transportation and make a series of stops. It is unnecessary for the electronic device 2 to keep updating its location data if it stays in the same location for a period of time, for example, waiting at a distribution warehouse for the next leg of the transit.

The accelerometer 23 is provided for detecting a velocity variation of the electronic device 2. The controller 10 then uses the velocity variation to identify a transition event. In one example, if the controller 10 does not receive a velocity variation that indicates the electronic device 2 is moving, the controller 10 then identifies it as a "stationary" event and controls the GPS module to temporarily stop receiving updated GPS coordinates in order to conserve power. On the other hand, if the velocity variation indicates the electronic device 2 is moving, the controller 10 then identifies it as an "en route" event and controls the GPS module to resume periodically receiving the updated GPS coordinates.

It may also not be necessary for the electronic device 2 to keep updating its location data during the majority of a long leg of a journey, for example, during 7 hours of an 8-hour flight. If the accelerometer 23 detects that the electronic device 2 has been moving for a certain length of time, the controller 10 can stop instructing the GPS module 11 to update the GPS coordinates to save power and restart updating the GPS coordinates when the accelerometer 23 detects no movement.

In another example, if the velocity variation indicates the electronic device 2 has not changed its moving status very much for a predetermined period of time, the controller 10 then controls the GPS module 11 to stop periodically updating the GPS coordinates in order to conserve powers until the velocity variation starts to indicate otherwise.

Figure 4:
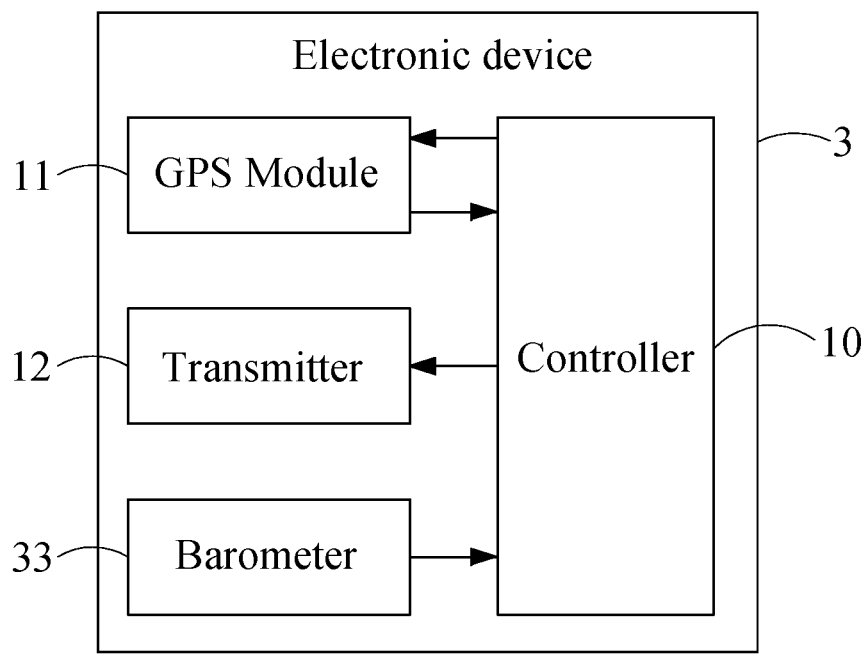
FIG. 4 is a block diagram of an electronic device with barometer according to an embodiment of the present invention.

Refer to FIG. 4, which is a block diagram of an electronic device 3 according to an embodiment of the present invention. Since the electronic device 3 has a similar component configuration with electronic device 1, components of the electronic device 3 that have the same or similar functions will be denoted with the same number to avoid confusion.

The electronic device 3 comprises the controller 10, the GPS module 11, the transmitter 12, and a barometer 33. Basic operations of the controller 10, the GPS module 11, and the transmitter 12 are detailed in the previous paragraphs and omitted here for brevity.

Most long range transportation is carried out by airline flights. When the electronic device 3 is in the air, it is unnecessary to keep updating its location because most location information is not relevant during transit. The barometer 33 is provided for detecting ambient pressure variations around the electronic device 3. The controller 10 then uses the ambient pressure variation to identify if the electronic device 3 is in the air.

For example, if the controller 10 receives an ambient pressure variation that indicates the electronic device 3 is in the air, the controller 10 then identifies it as an "in flight" event and controls the GPS module 11 to temporarily stop updated the GPS coordinates in order to conserve power until the ambient pressure variation starts to indicate otherwise.

Figure 5:
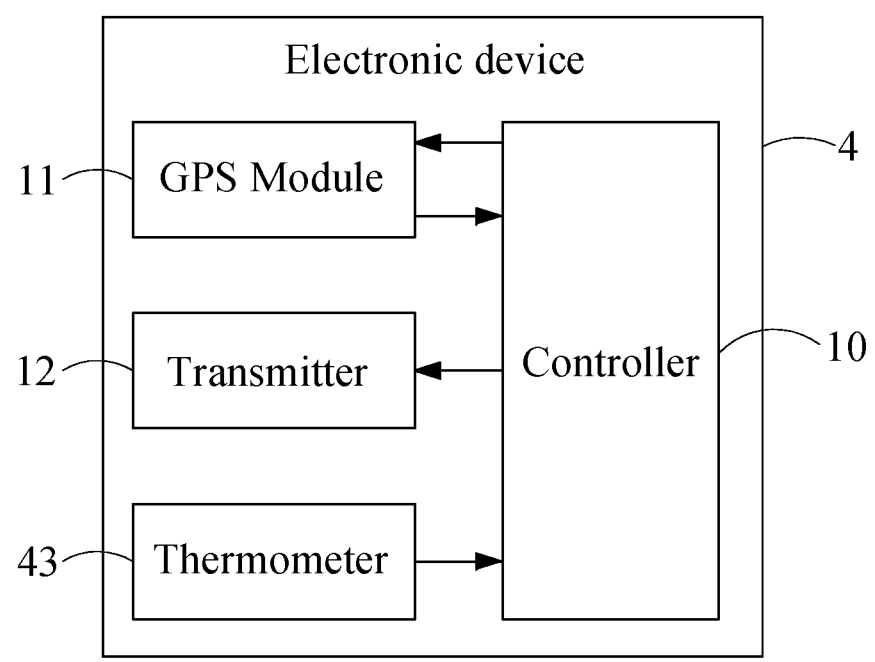
FIG. 5 is a block diagram of an electronic device with thermometer according to an embodiment of the present invention.

Refer to FIG. 5, which is a block diagram of an electronic device 4 according to an embodiment of the present invention. Since the electronic device 4 has a similar component configuration as electronic device 1, components of the electronic device 4 that have the same or similar functions will be denoted with the same number to avoid confusion.

The electronic device 4 comprises the controller 10, the GPS module 11, the transmitter 12, and a thermometer 43. Basic operations of controller 10, the GPS module 11, and the transmitter 12 are detailed in the previous paragraphs and omitted here for brevity.

When the electronic device 4 is en route to a destination, it might change carriers or modes of transportation and make a series of stops. For a tracking application, most significant information is usually which stop the electronic device 4 is currently at or was at previously. The thermometer 33 is provided for detecting ambient temperature variations around the electronic device 4. The ambient temperature variation usually indicates a sudden environment change, for example, opening or closing of a door of a cargo hold, or a transition to a new storage area.

For example, if the controller 10 receives an ambient temperature variation that indicates the electronic device 4 is about to change venue, the controller 10 then identifies it as a "transition" event and controls the GPS module 11 to receive the updated GPS coordinate immediately and disregard the usual periodic rule. In this way, important tracking information such as change of venues will not be missed.

In some embodiments, the electronic device comprises a combination of sensors. For example, an accelerometer, a thermometer, and a barometer are provided in the electronic device.

The above examples are merely for illustrative purpose only, and not meant for a limitation of the present invention. Those skilled in the art should readily understand how the controller 10 may exploit the velocity, ambient pressure, ambient temperature variation information to modulate power consumption of the electronic device 1 and can include either or any combinations of the velocity, ambient pressure, or ambient temperature variation to control the GPS module to receive or not receive the updated GPS coordinates without departing from the spirit of present invention.

For example, an electronic device utilizing both accelerometer and thermometer to control the GPS module to receive or not receive the updated GPS coordinates should fall into the scope of the present invention. An electronic device utilizing an accelerometer, a barometer, and a thermometer to control the GPS module to receive or not receive the updated GPS coordinates should also fall into the scope of the present invention.

In some embodiments, the controller 10 needs to identify the country where the electronic device 1, 2, 3, or 4 is located in order to determine a suitable radio communications configuration for the electronic device 1, 2, 3, or 4. In embodiments, the scheme of finding the country has two stages. Firstly, divide the globe into 4 different zones and use the longitude and the latitude of the updated GPS coordinates to identify which zone the electronic device 1, 2, 3, or 4 is in. This focuses the task to one region of the whole world and thus greatly saves processing power of the controller 10.

For example, when the longitude is less than 180 but more than 97.3 and the latitude is less than 90 but more than 20.5, the controller 10 determines the electronic device is in a first zone, when the longitude is less than 97.3 but more than −32 and the latitude is less than 20.5 but more than −90, the controller 10 determines the electronic device is in a second zone, when the longitude is less than −32 but more than −180, the controller 10 determines the electronic device is in a third zone, and when the longitude is less than 97.3 but more than −32, the controller 10 determines the electronic device is in a fourth zone.

Secondly, use the zone information to acquire a country list from which the longitude and the latitude of the updated GPS coordinates will be checked. Due to the fact that some areas (an area is a group of countries that are in proximity with one another) share the same or similar regulations on the use of the ISM frequency band, and hence the same radio communications configuration, the above process will rapidly shorten the candidate list of possible radio communication configurations.

For example, in an embodiment, when the zone information indicates the electronic device 1, 2, 3, or 4 is in the first zone, if the area information indicates the electronic device 1, 2, 3, or 4 is in Japan, the controller 10 determines the radio communications configuration to be Radio Configuration 3 (RC3), and if the area information indicates the electronic device 1, 2, 3, or 4 is in South Korea, the controller determines the radio communications configuration to be Radio Configuration 5 (RC5), otherwise the controller determines the radio communications configuration to be Radio Configuration 4 (RC4).

In an embodiment, when the zone information indicates the electronic device 1, 2, 3, or 4 is in the second zone, the controller 10 determines the radio communications configuration to be Radio Configuration 4 (RC4).

In an embodiment, when the zone information indicates the electronic device 1, 2, 3, or 4 is in the third zone, if the area information indicates the electronic device 1, 2, 3, or 4 is in the United States, Mexico, or Brazil, the controller determines the radio communications configuration to be Radio Configuration 2 (RC2), otherwise the controller determines the radio communications configuration to be Radio Configuration 4 (RC4).

In an embodiment, when the zone information indicates the electronic device 1, 2, 3, or 4 is in the fourth zone, if the area information indicates the electronic device 1, 2, 3, or 4 is in India, the controller determines the radio communications configuration to be Radio Configuration 6 (RC6), otherwise the controller determines the radio communications configuration to be Radio Configuration 1 (RC1).

Some wireless communications networks have regulations that limit the frequency band for how the network can be used. For example, the present standard of Sigfox wireless communications networks dictates that RC1 works on 868-878.6 MHz with an EIRP of 16 dBm, RC2 works on 902.1375-904.6625 MHz with an EIRP of 24 dBm, RC3 works on 922.3-923.5 MHz with an EIRP of 16 dBm, RC4 works on 920.1375-922.6625 MHz with an EIRP of 24 dBm, RC5 works on 922-923.4 MHz with an EIRP of 14 dBm, and RC6 works on 865-867 MHz with an EIRP of 16 dBm.

It should be noted that the regulations of the use of the ISM frequency band may change over time, and so may the specifications of protocols, however if changes are made, it is not apart from the spirit of the present invention.

Figure 6:
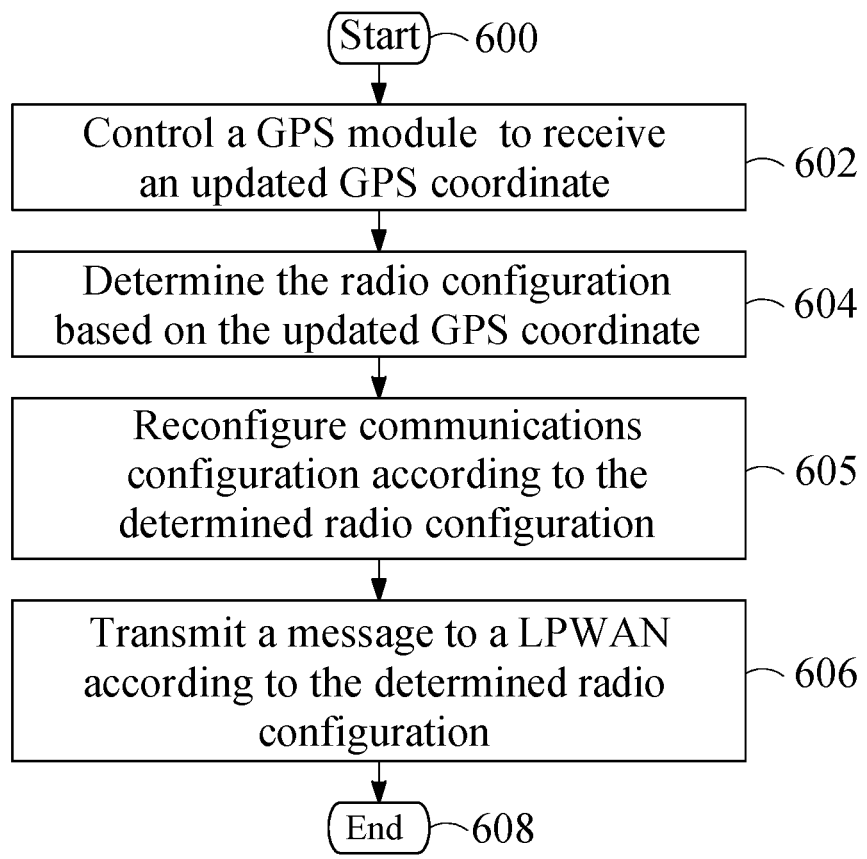
FIG. 6 is a flowchart of a method for determining a communications configuration of an electronic device with a GPS module according to an embodiment of the present invention.

Refer to FIG. 6, which is a flowchart of a method for determining a radio communications configuration of the electronic device 1, 2, 3, or 4 with the GPS module 11 according to an embodiment of the present invention. Provided that the result is substantially the same, the steps are not required to be executed in the exact order shown in FIG. 6. The method may be employed by the electronic device 1, 2, 3, or 4 shown in FIG. 1, 3, 4 or 5, respectively, and is summarized as below.

| | |
|---|---|
| Step 600: | Start. |
| Step 602: | Control the GPS module 11 to receive an updated GPS coordinate. |
| Step 604: | Determine the radio communications configuration based on the updated GPS coordinate. |
| Step 605: | Reconfigure the communications configuration according to the determined radio configuration. |
| Step 606: | Transmit a message using the communications configuration set by the determined radio communications configuration. |
| Step 608: | End |

Step 602, 604, and 605 can be performed by the controller 10 of the electronic device 1, 2, 3, or 4. Step 606 can be performed by the transmitter 12 of the electronic device 1, 2, 3, or 4. As a person skilled in the art can readily understand the operation of each step shown in FIG. 6 after reading the above paragraphs directed to the electronic device 1, 2, 3, or 4, further description is omitted here for brevity.

For example, the message described in the method of FIG. 6 contains information of the updated GPS coordinates. In embodiments of the present invention the message comprises the updated GPS coordinates and a device identification (ID).

In an embodiment, the electronic device 1, 2, 3, or 4 employing the method of FIG. 6 can be used as a tracker, and the method of FIG. 6 can be used for tracking.

Figure 7:
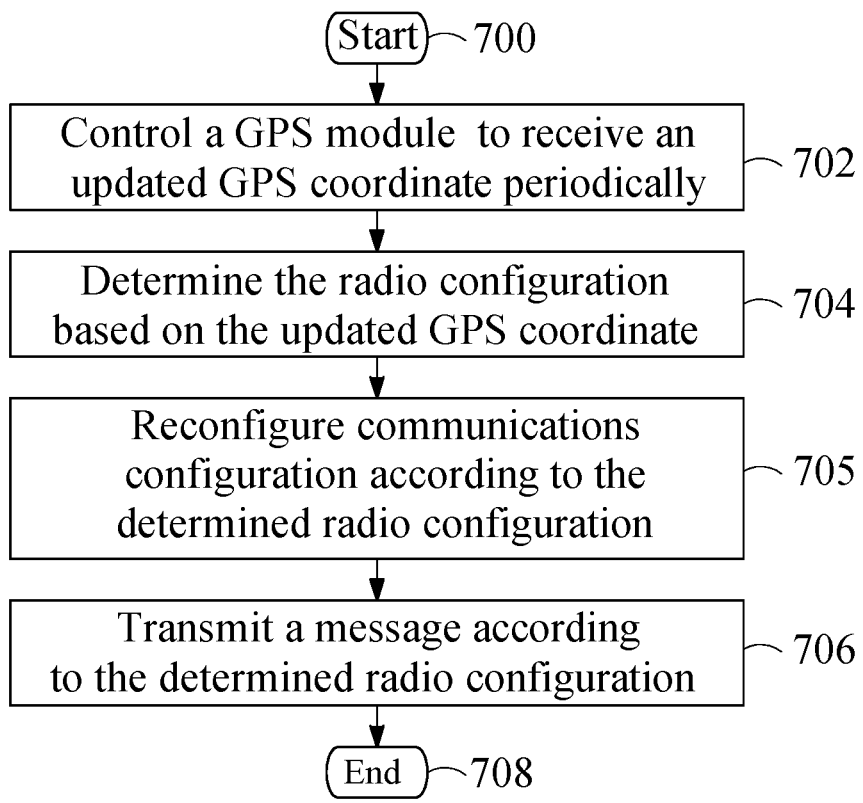
FIG. 7 is a flowchart of a method for determining a communications configuration of an electronic device with a GPS module according to an embodiment of the present invention.

Refer to FIG. 7, which is a flowchart of a method for determining a radio communications configuration of the electronic device 1, 2, 3, or 4 with the GPS module 11 according to an embodiment of the present invention. Provided that the result is substantially the same, the steps are not required to be executed in the exact order shown in FIG. 7. The method can be employed by the electronic device 1, 2, 3, or 4 shown in FIG. 1, 3, 4 or 5, respectively, and is summarized as below.

| | |
|---|---|
| Step 700: | Start. |
| Step 702: | Control the GPS module 11 to receive the updated GPS coordinate periodically. |
| Step 704: | Determine the radio communications configuration based on the updated GPS coordinate. |
| Step 705: | Reconfigure the communications configuration according to the determined radio configuration. |
| Step 706: | Transmit a message using the communications configuration set by the determined radio communications configuration. |
| Step 708: | End |

Step 702, 704, and 705 can be performed by the controller 10 of the electronic device 1, 2, 3, or 4. Step 706 can be performed by the transmitter 12 of the electronic device 1, 2, 3, or 4. As a person skilled in the art can readily understand the operation of each step shown in FIG. 7 after reading above paragraphs directed to the electronic device 1, 2, 3, or 4, further description is omitted here for brevity.

Figure 8:
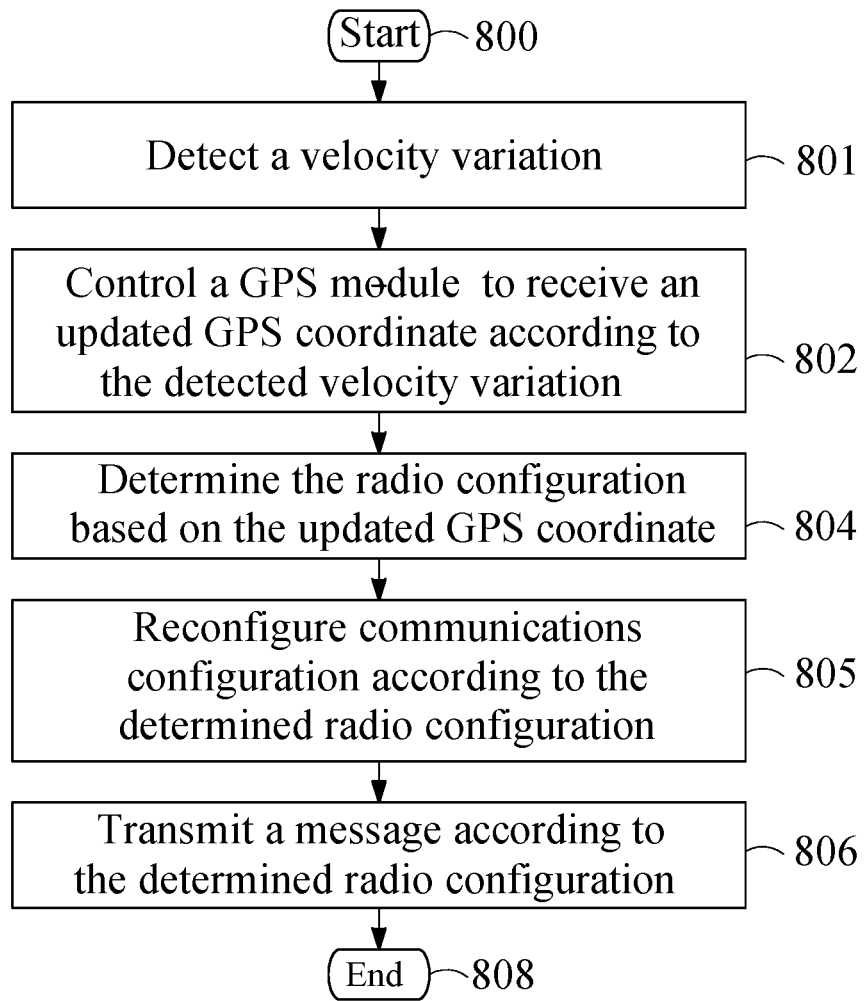
FIG. 8 is a flowchart of a method for determining a communications configuration of an electronic device with a GPS module according to an embodiment of the present invention.

Refer to FIG. 8, which is a flowchart of a method for determining a radio communications configuration of the electronic device 2 with the GPS module 11 according to an embodiment of the present invention. Provided that the result is substantially the same, the steps are not required to be executed in the exact order shown in FIG. 8. The method is employed by the electronic device 2 shown in FIG. 3, and is summarized as below.

| | |
|---|---|
| Step 800: | Start. |
| Step 801: | Detect a velocity variation. |
| Step 802: | Control the GPS module 11 to receive the updated GPS coordinate according to the detected velocity variation. |
| Step 804: | Determine the radio communications configuration based on the updated GPS coordinate. |
| Step 805: | Reconfigure the communications configuration according to the determined radio configuration. |
| Step 806: | Transmit a message using the communications configuration set by the determined radio communications configuration. |
| Step 808: | End |

Step 801 can be performed by the accelerometer 23 of the electronic device 2 shown in FIG. 3. Steps 802, 804, and 805 can be performed by the controller 10 of the electronic device 2. Step 806 can be performed by the transmitter 12 of the electronic device 2. As a person skilled in the art can readily understand the operation of each step shown in FIG. 8 after reading the above paragraphs directed to the electronic device 2, further description is omitted here for brevity.

Figure 9:
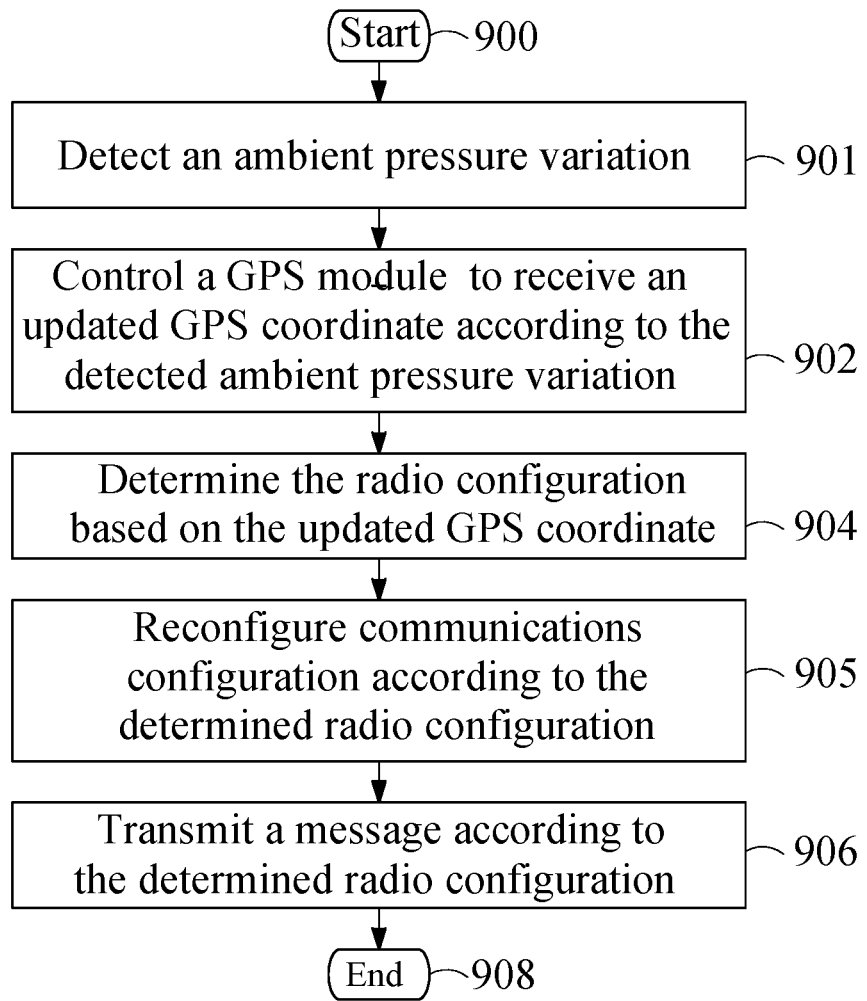
FIG. 9 is a flowchart of a method for determining a communications configuration of an electronic device with a GPS module according to an embodiment of the present invention.

Refer to FIG. 9, which is a flowchart of a method for determining a radio communications configuration of the electronic device 3 with the GPS module 11 according to an embodiment of the present invention. Provided that the result is substantially the same, the steps are not required to be executed in the exact order shown in FIG. 9. The method is employed by the electronic device 3 shown in FIG. 4, and is summarized as below.

| | |
|---|---|
| Step 900: | Start. |
| Step 901: | Detect an ambient pressure variation. |
| Step 902: | Control the GPS module 11 to receive the updated GPS coordinate according to the detected ambient pressure variation. |
| Step 904: | Determine the radio communications configuration based on the updated GPS coordinate. |
| Step 905: | Reconfigure the communications configuration according to the determined radio configuration. |
| Step 906: | Transmit a message using the communications configuration set by the determined radio communications configuration. |
| Step 908: | End |

Step 901 can be performed by the barometer 43 of the electronic device 3 shown in FIG. 4. Steps 902, 904, and 905 can be performed by the controller 10 of the electronic device 3. Step 906 can be performed by the transmitter 12 of the electronic device 3. As a person skilled in the art can readily understand the operation of each step shown in FIG. 9 after reading the above paragraphs directed to the electronic device 3, further description is omitted here for brevity.

Figure 10:
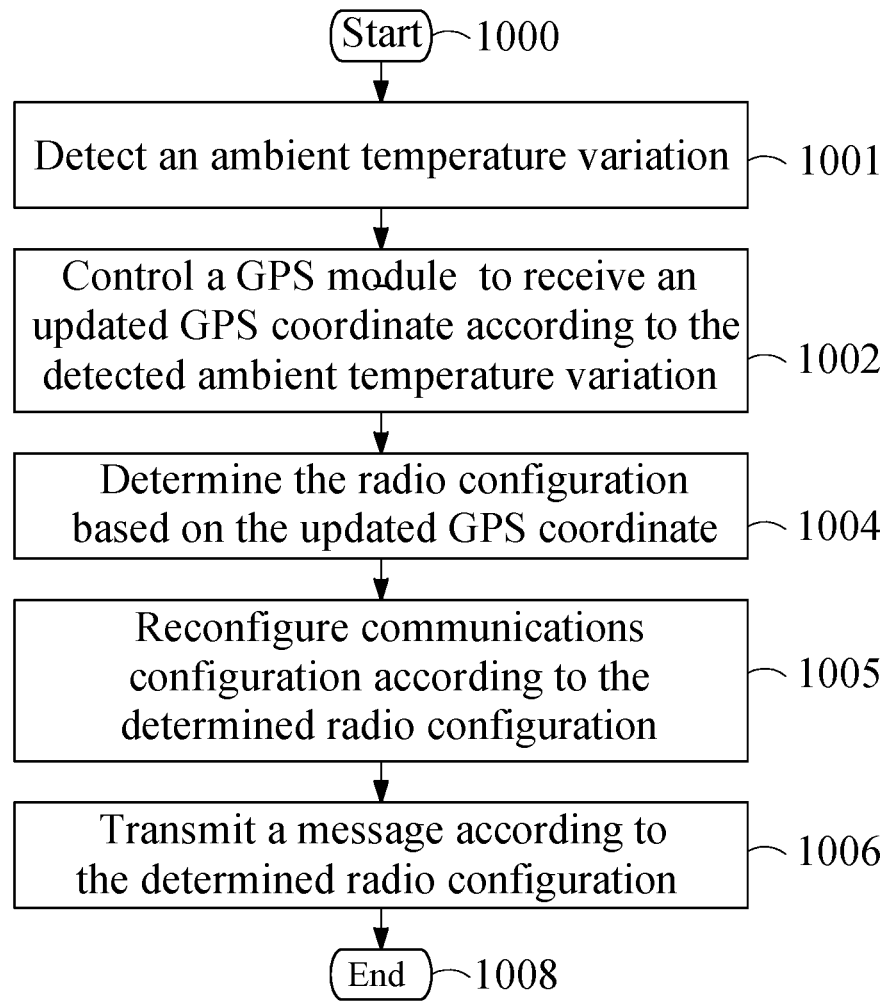
FIG. 10 is a flowchart of a method for determining a communications configuration of an electronic device with a GPS module according to an embodiment of the present invention.

Refer to FIG. 10, which is a flowchart of a method for determining a radio communications configuration of the electronic device 4 with the GPS module 11 according to an embodiment of the present invention. Provided that the result is substantially the same, the steps are not required to be executed in the exact order shown in FIG. 10. The method can be employed by the electronic device 4 shown in FIG. 5, and is summarized as below.

| | |
|---|---|
| Step 1000: | Start. |
| Step 1001: | Detect an ambient temperature variation. |
| Step 1002: | Control the GPS module 11 to receive the updated GPS coordinate according to the detected ambient temperature variation. |
| Step 1004: | Determine the radio communications configuration based on the updated GPS coordinate. |
| Step 1005: | Reconfigure the communications configuration according to the determined radio configuration. |
| Step 1006: | Transmit a message using the communications configuration set by the determined radio communications configuration. |
| Step 1008: | End |

Step 1001 can be performed by the thermometer 53 of the electronic device 4 shown in FIG. 5. Steps 1002, 1004, and 1005 can be performed by the controller 10 of the electronic device 4. Step 1006 can be performed by the transmitter 12 of the electronic device 4. As a person skilled in the art can readily understand the operation of each step shown in FIG. 10 after reading the above paragraphs directed to the electronic device 4, further description is omitted here for brevity.

Note that Steps 801, 901 and 1001 are for illustrative purposes only, and not meant for a limitation of the present invention. In other words, Steps 801, 901 or 1001 can also be used in any combinations in an alternate embodiment. For example, in an embodiment, the method can be carried out with both Steps 801 and 901. The step would be modified to "Control the GPS module 11 to receive the updated GPS coordinate according to the detected velocity variation and ambient pressure variation." Those skilled in the art can readily make the modification after reading the above paragraphs directed to FIGS. 8 and 9. Any alternate embodiments made in this way fall in the scope of the present invention and further description is omitted here for brevity.

In addition, in embodiments of the methods of FIGS. 6-10, a step of encrypting the message can be inserted before the step of transmitting the message.

Figure 11:
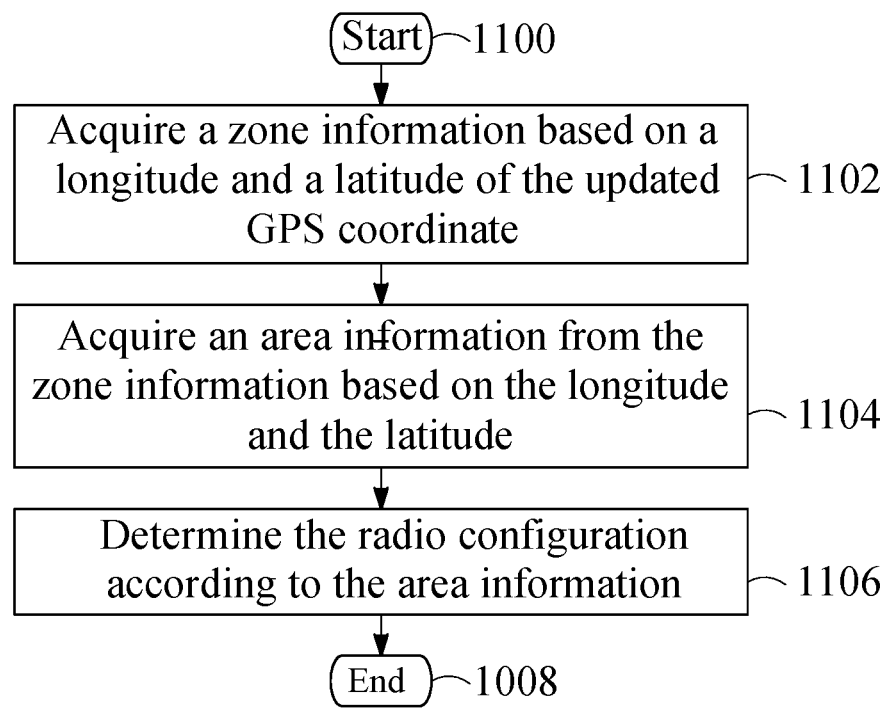
FIG. 11 is a flowchart expanding Steps 604 of FIG. 6, 704 of FIG. 7, 804 of FIG. 8, 904 of FIG. 9, or 1004 of FIG. 10.

In embodiments of the methods of FIGS. 6-10, the Steps 604, 704, 804, 904, or 1004 can be further broken down into 3 sub-steps. Refer to FIG. 11, which is a flow chart of an expanded version of Steps 604, 704, 804, 904, or 1004. Provided that the result is substantially the same, the steps are not required to be executed in the exact order shown in FIG. 11. The exemplary method can be employed by the electronic device 1, 2, 3, 4 shown in FIGS. 1, 3, 4, 5, respectively, and is summarized as below.

| | |
|---|---|
| Step 1100: | Start. |
| Step 1102: | Acquire a zone information based on a longitude and a latitude of the updated GPS coordinate. |
| Step 1104: | Acquire an area information from the zone information based on the longitude and the latitude. |
| Step 1106: | Determine the radio communications configuration according to the area information. |
| Step 1108: | End |

Steps 1102-1106 can be performed by the electronic device 1, 2, 3, or 4 shown in FIG. 1, 3, 4, or 5, respectively. As a person skilled in the art can readily understand the operation of each step shown in FIG. 11 after reading the above paragraphs directed to the electronic device 1, 2, 3, or 4, further description is omitted here for brevity.

It will be apparent to those skilled in the art that various modifications and variations can be made to the present invention without departing from the scope or spirit of the invention. In view of the foregoing, it is intended that the present invention cover modifications and variations of this invention provided they fall within the scope of the invention and its equivalent.

What is claimed is:

1. An electronic device capable of determining a radio communications configuration, comprising:
   a GPS module, arranged for receiving an updated GPS coordinate;
   a controller, electronically coupled to the GPS module, and arranged for controlling the GPS module to receive the updated GPS coordinate and for determining the radio communications configuration based on the updated GPS coordinate received from the GPS module; and
   a transmitter, electronically coupled to the controller, and arranged for transmitting a message from the controller to a low power wide area network (LPWAN) according to the determined radio communications configuration;
   wherein the controller acquires a zone information based on a longitude and a latitude of the updated GPS coordinate, then acquires an area information from the zone information based on the longitude and the latitude, and determines the radio configuration according to the area information; and
   wherein when the longitude is less than 180 but more than 97.3 and the latitude is less than 90 but more than 20.5, the zone information indicates the electronic device is in a first zone, when the longitude is less than 97.3 but more than −32 and the latitude is less than 20.5 but more than −90, the zone information indicates the electronic device is in a second zone, when the longitude is less than −32 but more than −180, the zone information indicates the electronic device is in a third zone, and when the longitude is less than 97.3 but more than −32, the zone information indicates the electronic device is in a fourth zone.

2. The electronic device of claim 1, wherein the electronic device is a tracker, and the message transmitted by the transmitter contains information of the updated GPS coordinate.

3. The electronic device of claim 1, the controller controls the GPS module to receive the updated GPS coordinate periodically.

4. The electronic device of claim 1, the electronic device further comprises:
   an accelerometer, electronically coupled to the controller, and arranged for detecting a velocity variation of the electronic device;

wherein the controller controls the GPS module to receive the updated GPS coordinate according to the detected velocity variation.

5. The electronic device of claim 1, the electronic device further comprises:
a barometer, electronically coupled to the controller, and arranged for detecting an ambient pressure variation around the electronic device;
wherein the controller controls the GPS module to receive the updated GPS coordinate according to the detected ambient pressure variation.

6. The electronic device of claim 1, the electronic device further comprises:
a thermometer, electronically coupled to the controller, and arranged for detecting an ambient temperature variation around the electronic device;
wherein the controller controls the GPS module to receive the updated GPS coordinate according to the detected ambient temperature variation.

7. The electronic device of claim 1, wherein the controller encrypts the message before transmission.

8. A method for determining a radio communications configuration of an electronic device with a GPS module, comprising steps:
controlling a GPS module to receive an updated GPS coordinate;
determining the radio communications configuration based on the updated GPS coordinate; and
transmitting a message to a low power wide area network (LPWAN) according to the determined radio communications configuration;
wherein the step of determining the radio communications configuration comprises:
acquiring a zone information based on a longitude and a latitude of the updated GPS coordinate;
acquiring an area information from the zone information based on the longitude and the latitude; and
determining the radio communications configuration according to the area information; and
wherein when the longitude is less than 180 but more than 97.3 and the latitude is less than 90 but more than 20.5, the zone information indicates the electronic device is in a first zone, when the longitude is less than 97.3 but more than −32 and the latitude is less than 20.5 but more than −90, the zone information indicates the electronic device is in a second zone, when the longitude is less than −32 but more than −180, the zone information indicates the electronic device is in a third zone, and when the longitude is less than 97.3 but more than −32, the zone information indicates the electronic device is in a fourth zone.

9. The method of determining the radio communications configuration of claim 8, wherein the message transmitted contains information of the updated GPS coordinate.

10. The method of determining the radio communications configuration of claim 8, wherein the step of controlling the GPS module to receive the updated GPS comprises:
controlling the GPS module to receive the updated GPS coordinate periodically.

11. The method of determining the radio communications configuration of claim 8, wherein the step of controlling the GPS module to receive the updated GPS comprises:
detecting a velocity variation of the electronic device; and
controlling the GPS module to receive the updated GPS coordinate according to the detected velocity variation.

12. The method of determining the radio communications configuration of claim 8, wherein the step of controlling the GPS module to receive the updated GPS comprises:
detecting an ambient pressure variation around the electronic device; and
controlling the GPS module to receive the updated GPS coordinate according to the detected ambient pressure variation.

13. The method of determining the radio communications configuration of claim 8, wherein the step of controlling the GPS module to receive the updated GPS comprises:
detecting an ambient temperature variation around the electronic device; and
controlling the GPS module to receive the updated GPS coordinate according to the detected ambient temperature variation.

14. The method of determining the radio communications configuration of claim 8, further comprising step of:
encrypting the message.

* * * * *